(12) United States Patent
Skoglund

(10) Patent No.: US 12,317,989 B1
(45) Date of Patent: Jun. 3, 2025

(54) BAG IN PARTICULAR A BACKPACK FOR PLACEMENT IN AN AIRCRAFT EJECTION SEAT

(71) Applicant: Life Support International, Inc., Langhorne, PA (US)

(72) Inventor: Eric Skoglund, Doylestown, PA (US)

(73) Assignee: LIFE SUPPORT INTERNATIONAL, INC., Langhorne, PA (US)

( * ) Notice: Subject to any disclaimer, the term of this patent is extended or adjusted under 35 U.S.C. 154(b) by 555 days.

(21) Appl. No.: 16/994,866

(22) Filed: Aug. 17, 2020

Related U.S. Application Data

(60) Provisional application No. 62/889,603, filed on Aug. 21, 2019.

(51) Int. Cl.
| | | |
|---|---|---|
| *A45F 3/04* | (2006.01) | |
| *A45C 13/02* | (2006.01) | |
| *A45F 3/06* | (2006.01) | |
| *B64D 25/10* | (2006.01) | |

(52) U.S. Cl.
CPC ............. *A45F 3/06* (2013.01); *A45C 13/02* (2013.01); *B64D 25/10* (2013.01)

(58) Field of Classification Search
CPC . A45C 13/02; A45C 7/0095; A45F 2003/045; A45F 2003/142; A45F 3/04; A45F 3/047; A45F 3/06; A45F 3/14; B64D 17/40; B64D 17/44; B64D 25/10
USPC ......................................................... 224/580
See application file for complete search history.

(56) References Cited

U.S. PATENT DOCUMENTS

| | | | | |
|---|---|---|---|---|
| 2,275,114 A | * | 3/1942 | Smith .................... | B64D 17/30 244/151 R |
| 4,936,495 A | * | 6/1990 | Van de Pol ............... | A45F 3/04 112/440 |
| 5,209,384 A | * | 5/1993 | Anderson ................ | B25H 3/00 224/652 |
| 5,638,915 A | * | 6/1997 | Hardy ...................... | E06C 7/14 182/129 |

(Continued)

FOREIGN PATENT DOCUMENTS

| | | | | |
|---|---|---|---|---|
| EP | 2404525 B1 | * | 4/2016 | ............... A45F 3/14 |
| GB | 844618 A | * | 8/1960 | |

OTHER PUBLICATIONS

EP 2404525 B1 translation, Rinklake Apr. 20, 2016 (Year: 2016).*

*Primary Examiner* — Nathan J Newhouse
*Assistant Examiner* — Matthew T Theis
(74) *Attorney, Agent, or Firm* — FRESH IP PLC

(57) ABSTRACT

A bag includes a back wall, a front wall, a bottom wall and a side wall extending from one end portion of the bottom wall to an opposite end portion of the bottom wall; a first interior wall disposed between the front wall and the back wall to define a first compartment between the front wall and the interior wall, and a second compartment between the back wall and the first interior wall; the side wall including a first opening for access into the first compartment and a second opening for access into the second compartment, the first opening and the second opening extending from the one end portion to the opposite end portion of bottom wall to allow the first compartment or the second compartment to open flat inside out; and a first zipper and a second zipper operably attached to the side wall for closing or opening the respective first opening and the second opening.

20 Claims, 14 Drawing Sheets

(56) References Cited

U.S. PATENT DOCUMENTS

| | | | |
|---|---|---|---|
| 9,060,589 B1* | 6/2015 | Gershfeld | A45F 3/04 |
| 2003/0183668 A1* | 10/2003 | Hancock | B62J 9/27 |
| | | | 224/572 |
| 2004/0065573 A1* | 4/2004 | Brouard | A45C 13/02 |
| | | | 206/373 |
| 2008/0023513 A1* | 1/2008 | Hadj-Chikh | A45F 3/46 |
| | | | 224/645 |
| 2011/0220765 A1* | 9/2011 | Eric | B64D 17/64 |
| | | | 244/148 |

* cited by examiner

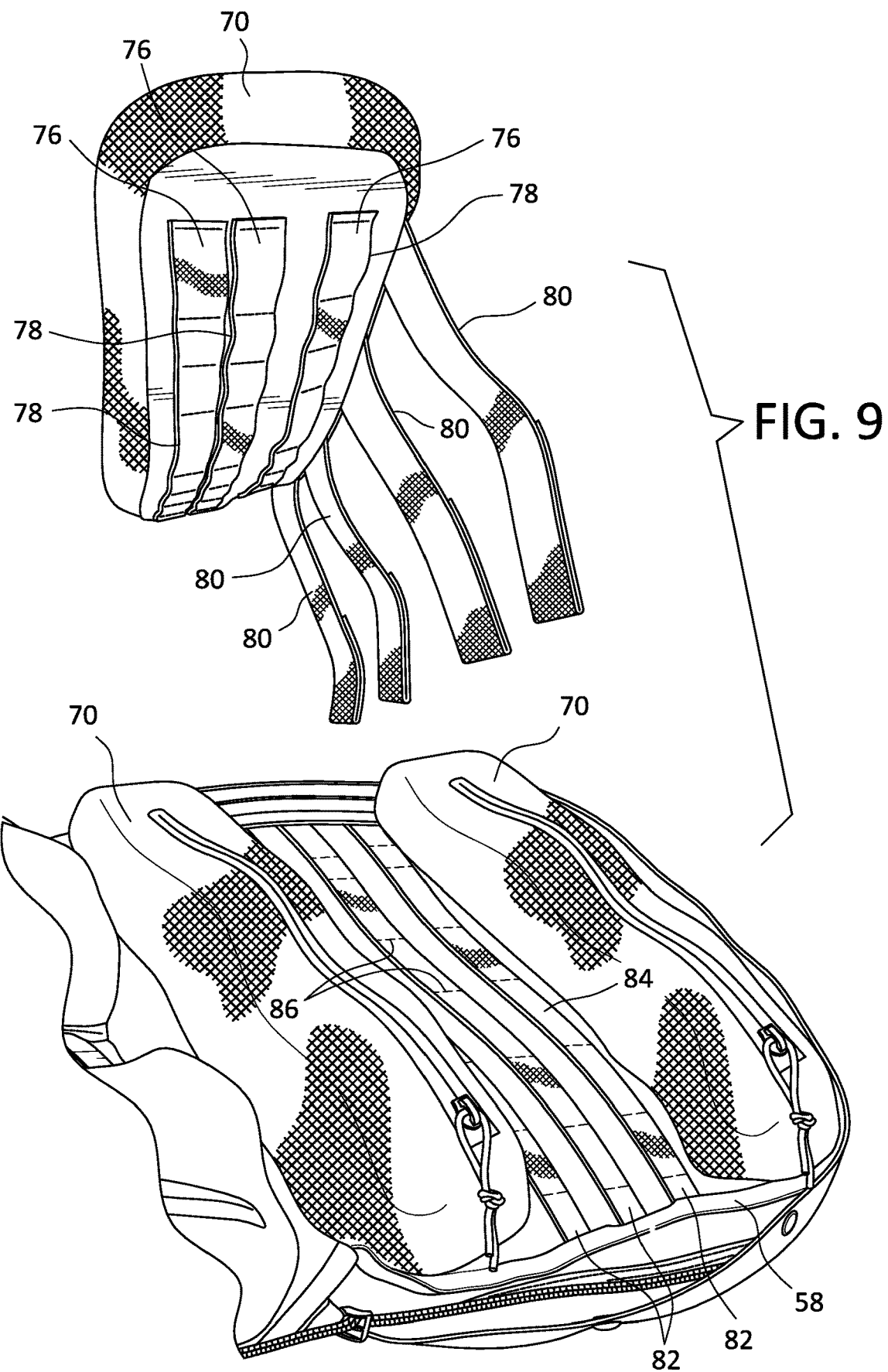

US 12,317,989 B1

BAG IN PARTICULAR A BACKPACK FOR PLACEMENT IN AN AIRCRAFT EJECTION SEAT

RELATED APPLICATION

This is a nonprovisional application claiming the priority benefit of provisional application Ser. No. 62/889,603, filed Aug. 21, 2020, hereby incorporated by reference.

FIELD OF THE INVENTION

The present invention is generally directed to a bag and in particular to a backpack for placement in an aircraft ejection seat, the backpack for carrying various survival items.

SUMMARY OF THE INVENTION

The present invention a bag comprising a back wall, a front wall, a bottom wall and a side wall extending from one end portion of the bottom wall to an opposite end portion of the bottom wall; a first interior wall disposed between the front wall and the back wall to define a first compartment between the front wall and the interior wall, and a second compartment between the back wall and the first interior wall; the side wall including a first opening for access into the first compartment and a second opening for access into the second compartment, the first opening and the second opening extending from the one end portion to the opposite end portion of bottom wall to allow the first compartment or the second compartment to open flat inside out; a first zipper and a second zipper operably attached to the side wall for closing or opening the respective first opening and the second opening.

The present invention also provides a backpack, comprising a front wall and a back wall; a first shoulder strap and a second shoulder strap; the first shoulder strap including a first end portion and a second end portion, the first end portion is operably attached to an upper portion of the back wall; the second shoulder strap including a third end portion and a fourth end portion, the third end portion is operably attached the upper portion of the back wall; and a lower strap with an intermediate portion horizontally attached to a lower portion of the bag, the strap including a fifth end portion operably attached to the first end portion and a sixth end portion operably attached to the fourth end portion, and a fourth end portion operably attached the sixth end portion.

The present invention further provides a bag, comprising a front wall and a back wall; a strap attached to the front wall and the back wall, the strap including first and second portions disposed vertically on the front wall and forming a first half-loop above the bag, the strap including third and fourth portions disposed vertically on the back wall and forming a second half-loop above the bag, the first half-loop and the second half-loop providing openings for the user's hand to carry the bag; and a first zipper operably attached to the front wall and the back wall, the first zipper extending from one side to an opposite side of the bottom wall to allow the bag to open flat inside out.

BRIEF DESCRIPTION OF THE DRAWINGS

FIG. 9 shows a perspective view of a mesh bag detached from the backpack.

DETAILED DESCRIPTION OF THE INVENTION

Figure 1:
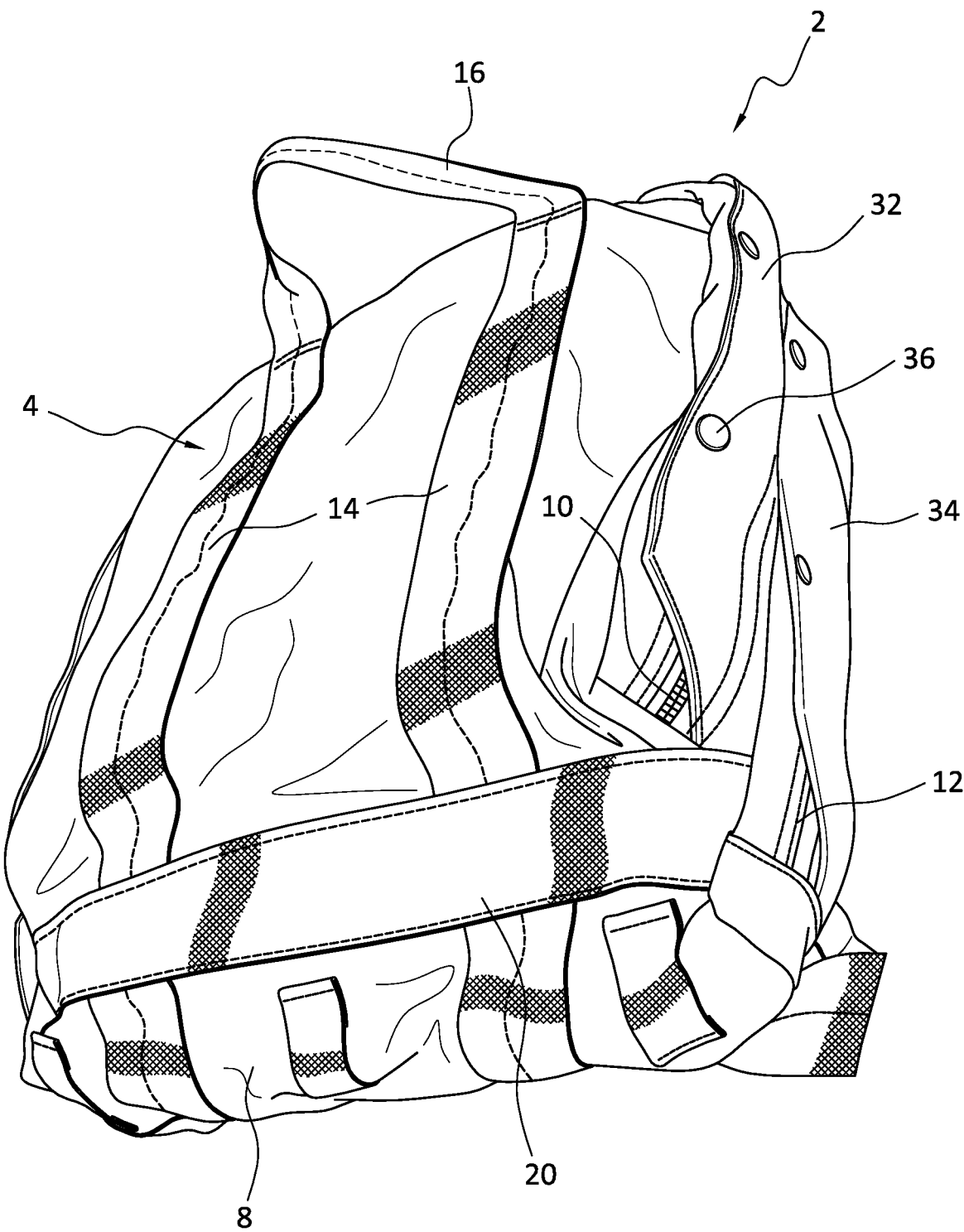
FIG. 1 is a front perspective view of a backpack embodying the present invention.
Figure 2:
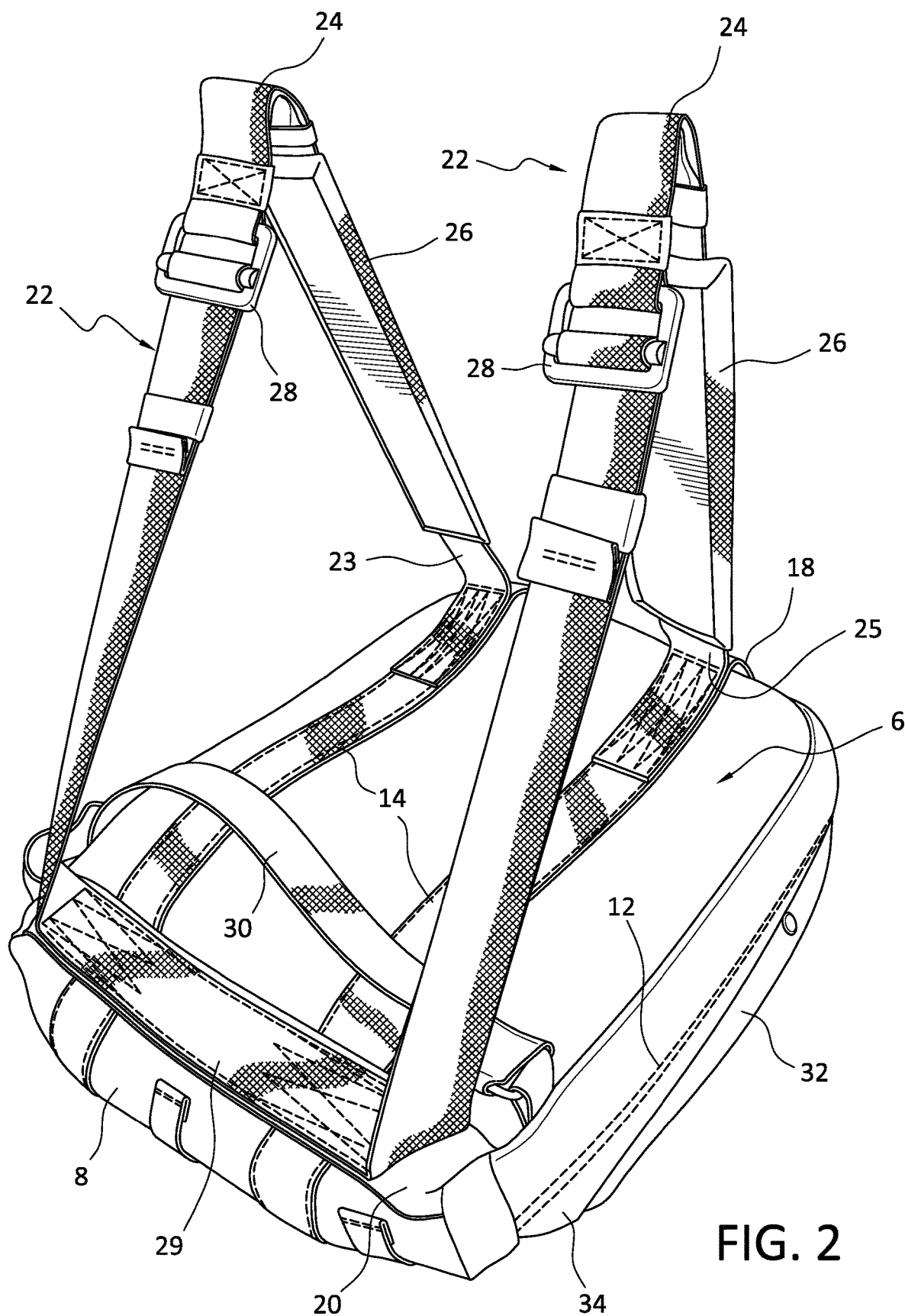
FIGS. 2 and 3 are back perspective views of the backpack shown in FIG. 1.

A backpack 2 embodying the present invention is disclosed. Referring to FIGS. 1 and 2, the backpack 2 includes a front wall 4, a back wall 6 and a bottom wall 8 operably joined together, such as sewing or stitching, to form an interior volume space. When the backpack 2 is carried on the user's shoulders, the back wall 6 is adjacent to the back of the user. The back wall 6 defines the back of the backpack 2 and the front wall 4 the front. Zippers 10 and 12 are operably attached to the front wall 4 and the back wall 6 to provide access openings into the interior volume space. The zippers 10 and 12 preferably extend along the left, top and right sides of the backpack to allow the front wall 4 and the back wall 6 to open flat like an open book, exposing the interior of the backpack inside out. The backpack 2 may be made of any suitable flexible material, such canvas, Nylon, etc.

A reinforcement strap 14 is operably attached by sewing or stitching or other standard means to the front wall 4, the bottom wall 8 and the rear wall 6. The strap 14 makes a complete loop, running vertically up and vertically down on front wall 4 and the back wall 6 and underneath the bottom wall 8. Half-loop handle 16 and 18 are formed by the strap 14 when changing direction above the backpack. The strap 14 advantageously supports the weight of the backpack 2 and its contents when carried by the user at the half-loop handles 16 and 18. The strap 14 advantageously cradles the backpack and its weight when carried by the user by the half-loop handles 16 and 18. A bottom reinforcement strap 20 is attached to the bottom wall 8. This strap is preferably continuous from one side of the bag to the other. The strap 14 takes all of the load from the backpack in the event the zippers 10 and 12 and the snaps 36 fail; the backpack can still be structurally sound for use.

Shoulder straps 22 are preferably attached to the reinforcement straps 14 at the upper portion of the backpack and the horizontal reinforcement strap 20 at the bottom portion of the backpack by stitching or other standard means. The shoulder straps 22 are formed from straps 23 and 25 with respective end portions operably attached to the upper portion of the back wall 6. Preferably, the end portions of the straps 23 and 25 are also attached to the strap 14. The shoulder straps 22 further include a strap 29 whose intermediate portion is attached horizontally across the lower portion of the back wall 6. Preferably, the intermediate portion of the strap 29 is also attached to the reinforcement strap 20 and the straps 14. The end portions of the strap 29 are attached to the respective end portions of the straps 23 and 25 via respective adjusting buckles 28. The shoulder straps 22 advantageously make a complete loop through a path along the straps 14, 23, 25 and 29.

The shoulder straps 22 advantageously function as a suspension system to cradle the backpack when the shoulder straps 22 are brought out to the front of the backpack to support the load when dropped via a dropline to ensure the load is not transferred through the zippers. The straps 14, which are attached to the shoulder straps 22, advantageously provide longitudinal support and the strap 29 provides lateral support to the backpack 2 (see FIG. 13). Loops 24 are provided in the shoulder straps 22 for attaching the backpack 2 to a parachute as will be described below.

Shoulder pads 26 are attached to the shoulder straps 22 for added comfort to the user. The shoulder straps 22 are adjustable by means of the standard adjusting buckles 28. A waist strap 30 is provided for stability when carrying the backpack on the user's shoulders and back.

Flaps 32 and 34 are operably attached to one side of the respective zippers 10 and 12 and removably attached to the opposite sides of the zippers 10 and 12 with detachable snaps 36. The flaps 32 and 34 advantageously reinforce the zippers 10 and 12 and provide cover to the openings into the backpack when the zippers 10 and 12 are not closed.

Figure 3:
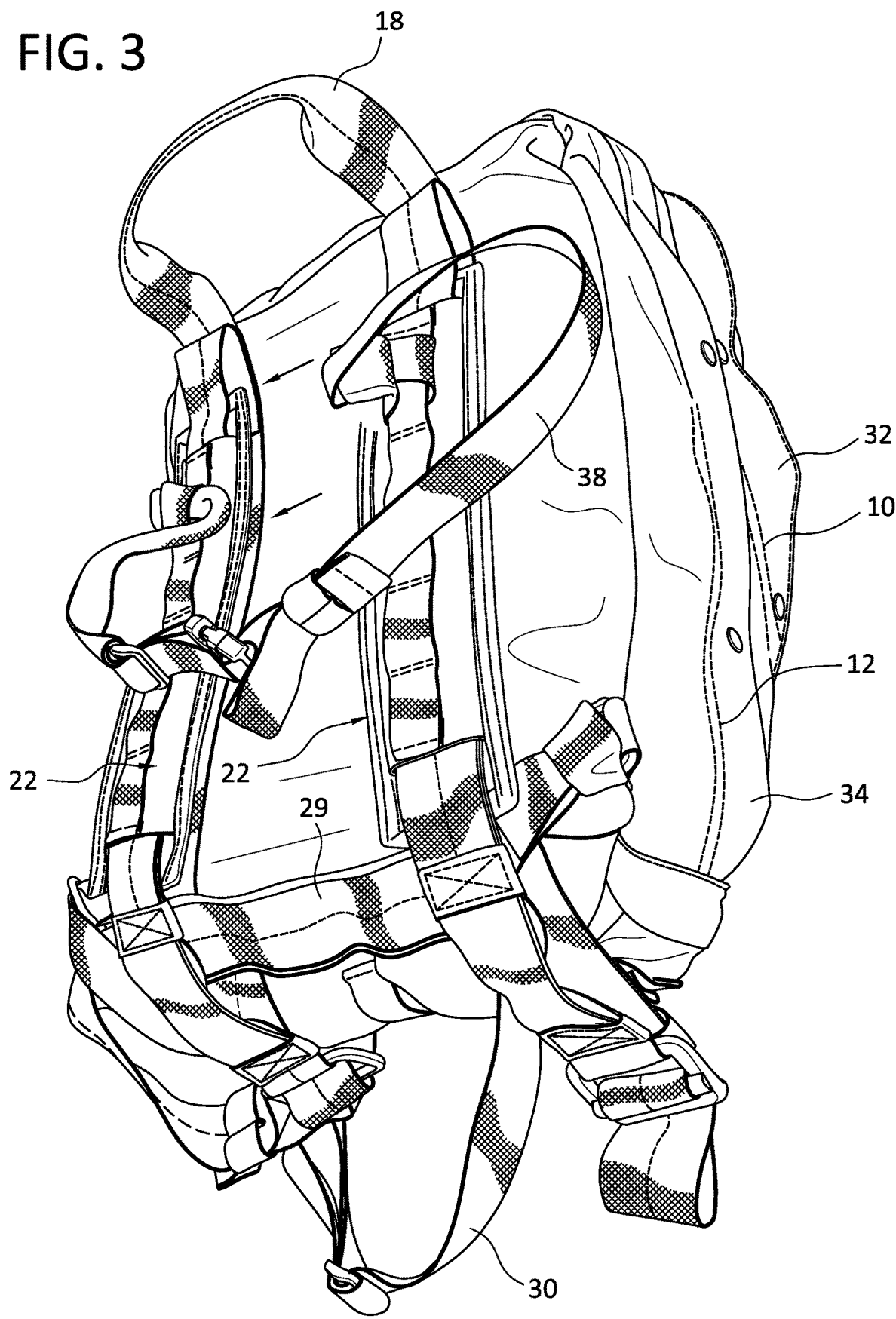

Referring to FIG. 3, a chest compression strap 38 may be provided for additional carrying ease of the backpack 2. The strap 38 is operably attached to the shoulder straps 22.

Figure 4:
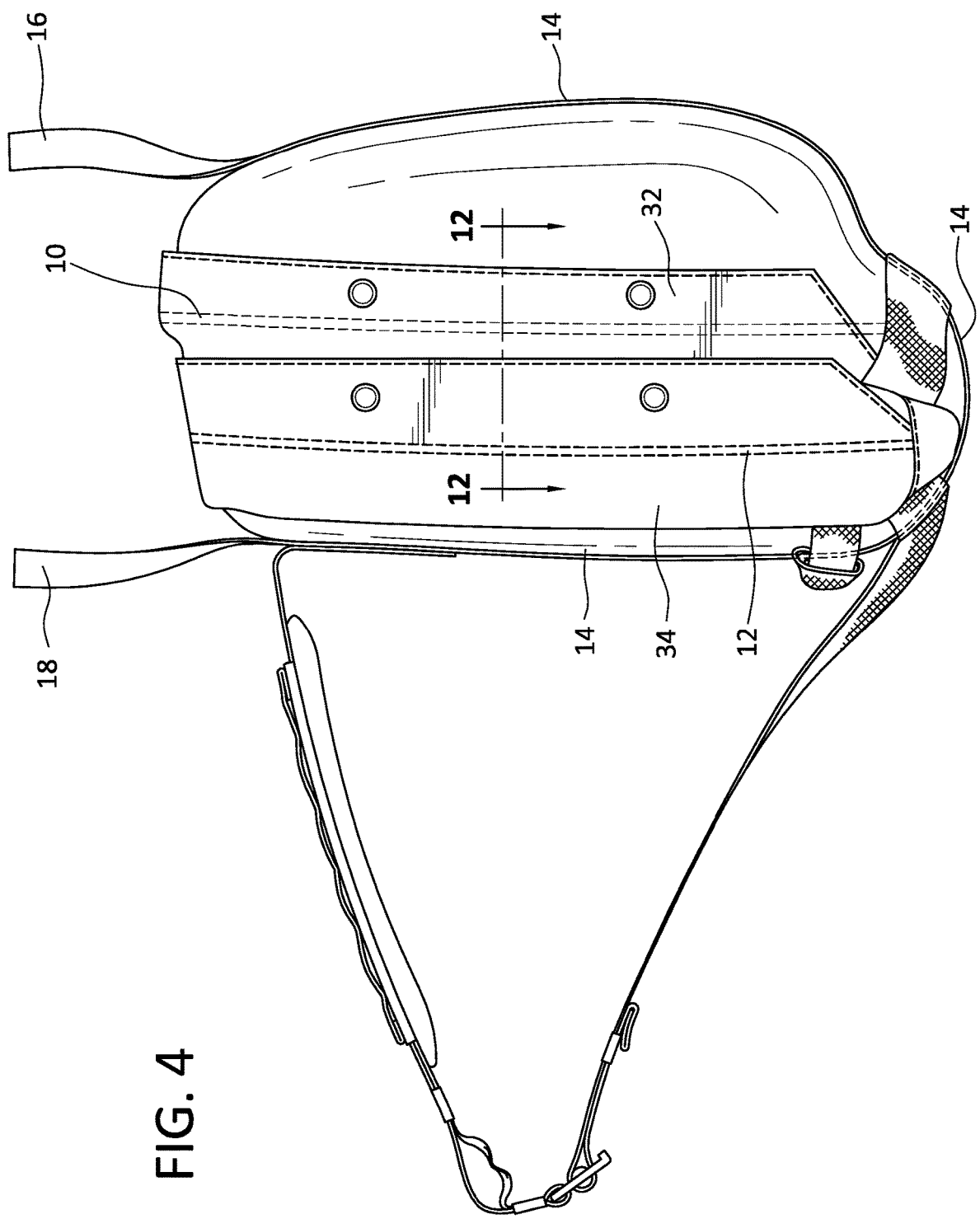
FIG. 4 is a side elevational view of the backpack shown in FIG. 1.

Referring to FIG. 4, the flaps 32 and 34 are shown disposed over the respective zippers 10 and 12 and removably attached to the opposite sides with detachable snaps 36, advantageously reinforcing the zippers 10 and 12 and providing additional covers to the openings into the backpack 2.

Figure 5:
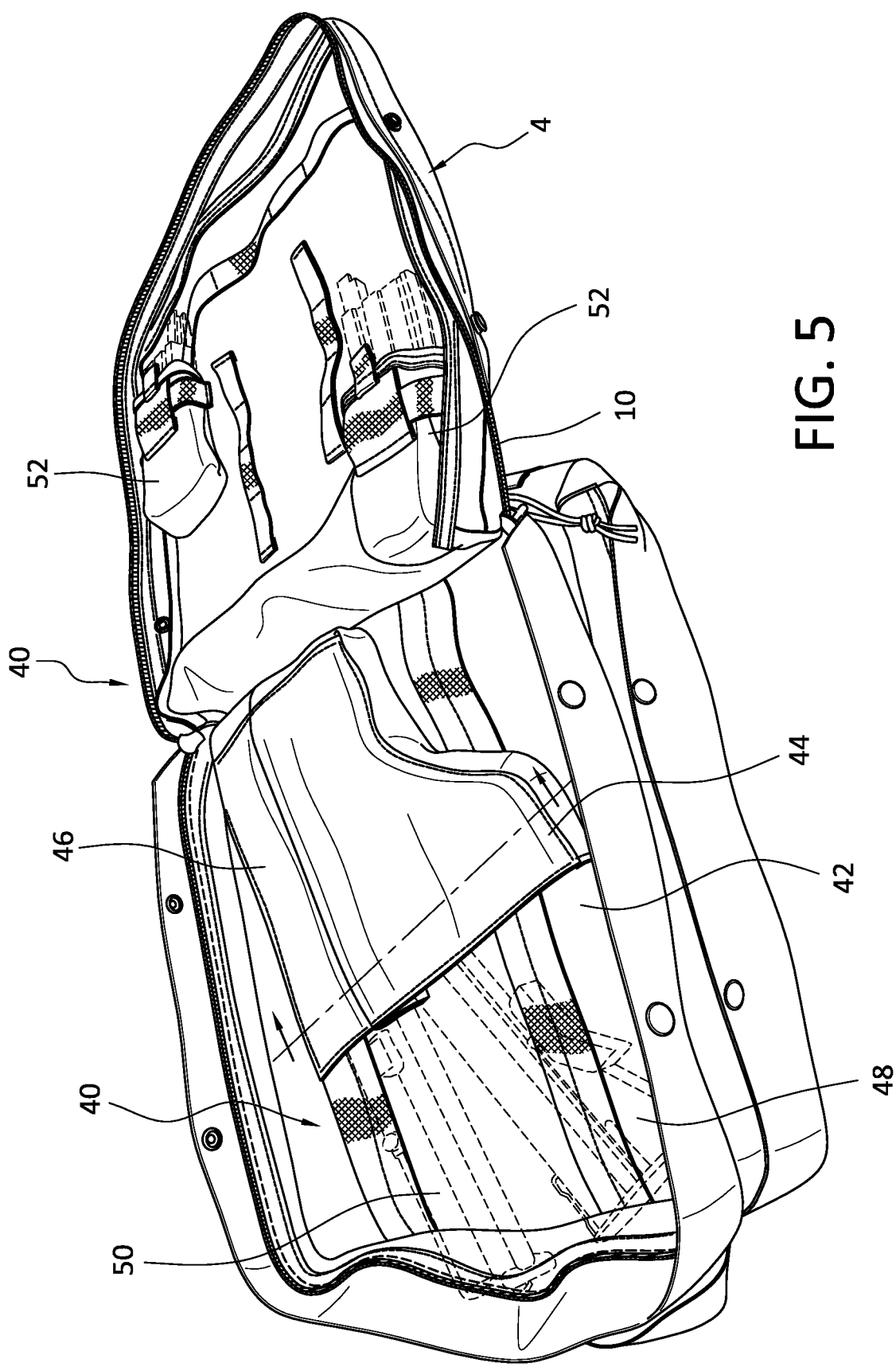
FIG. 5 is a perspective view of the backpack showing a front compartment in the open position inside out.

Referring to FIG. 5, the zipper 10 allows the front wall 4 to be opened flat, rotating substantially 180° from the bottom wall 8, exposing the inside of a front compartment 40 defined by the front wall 4 and a front middle wall 42. When the front compartment 40 is laid open, the front wall 4 stays on one side of the zipper 10 and the middle front wall 42 stays on the other side of the zipper 10. The zipper 10 advantageously extends from the bottom of the backpack to the top and back to the bottom on the other side of the backpack to allow the front wall 4 to rotate at the bottom and lay flat on its back, like an open book, exposing the interior of the backpack inside out. A pocket 44 and a pocket 46 are preferably attached to the wall 42. The pockets 44 and 46 are used to hold a broken down rifle, such as one designated by U.S. Air Force as GAU-5/A. The GAU-5/A rifle breaks down into two pieces, one piece being the receiver and the gunstock 48 and the other being the barrel 50.

The pocket 44 may be used for the gunstock and receiver 48 and the pocket 46 for the barrel 50. The rifle pieces are longitudinal and are advantageously disposed vertically inside the respective pockets 44 and 46. In this manner, the backpack 2 is able to flex along vertical lines to allow the backpack to conform to the user's back and allow for proper storage into the ejection seat kit. The pockets 44 and 46 can advantageously fit various sized firearms to allow for other user communities with different requirements to use it.

The shape of the pocket 44 is similar to the shape of a gun holster and is advantageously oriented for proper positioning of a handgun when the user grabs it with a right hand. It is also positioned to allow proper packaging of all contents within the backpack to allow for proper stowage within the ejection seat kit. The pocket 44 is wider at the top portion to accommodate the grip of a firearm than at the bottom portion that accommodates the barrel of the handgun. The pocket 44 is advantageously attached to the wall 42 so that the firearm remains vertical for quick access by the user when the backpack is vertical and the compartment 40 is completely opened to let the front wall 4 fall down by gravity. The location of the pocket 44 in the outer compartment 40 advantageously provides for quick access to the firearm by the user in a hostile environment. It is also positioned to allow proper packaging of all contents within the backpack to allow for proper stowage within the ejection seat kit.

Pockets 52 are attached to the front wall 4. The pockets 48 may be used to hold magazines for the rifle. For the GAU-5A, the pockets 52 are sized to each hold two magazines. For other firearms that use magazines, these pockets may hold more or less than two. The magazines are advantageously disposed vertically inside the pockets 52 to allow the backpack 2 to flex along vertical lines while being carried on the user's back. It is also positioned to allow proper packaging of all contents within the backpack to allow for proper stowage within the ejection seat kit.

The zipper 10 advantageously provides a quick access into the compartment 40 and its contents. When the compartment 40 is opened, the contents are held in an orderly fashion for quick access and use. After taking out the rifle, the compartment 40 may be used to store other items.

Figure 6:
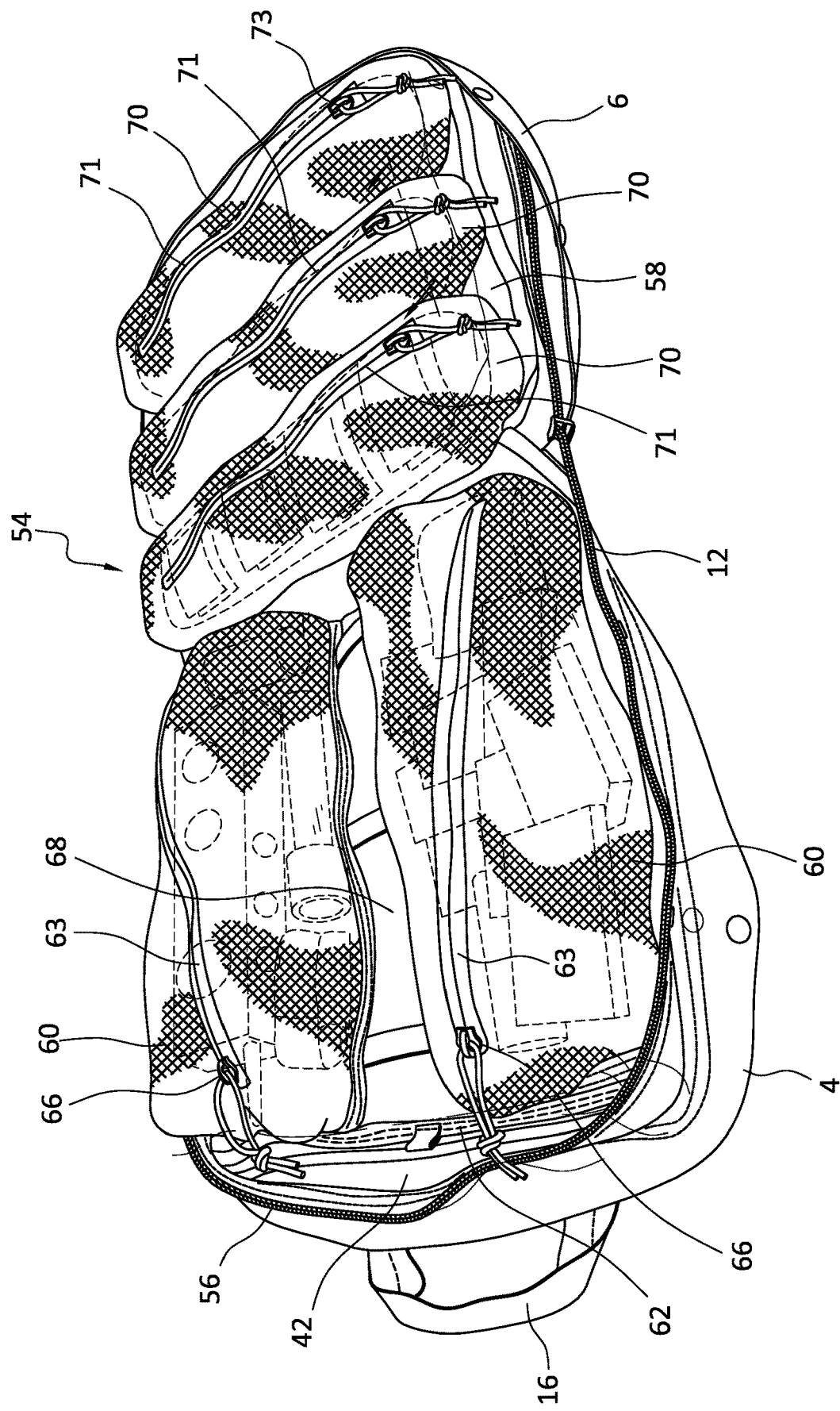
FIG. 6 is a perspective view of the backpack showing a rear compartment in the open position inside out.

Referring to FIG. 6, the zipper 12 opens a rear compartment 54 defined by a middle rear wall 56 and an interior rear wall 58. The zipper 12 allows the interior rear wall 58 and the middle rear wall 56 to be opened flat, rotating substantially 180° from the bottom wall 8, exposing the interior of the rear compartment 54 inside out. The zipper 12 advantageously extends from the bottom of the backpack to the top and back to the bottom on the other side of the backpack to allow the rear compartment 54 to open like a book, exposing the interior of the compartment 54 inside out.

When the rear compartment 54 is laid open, the middle rear wall 56 stays on one side of the zipper 12 and the interior rear wall 58 stays on the other side of the zipper 12. The middle rear wall 56 is adjacent to the middle front wall 42 and joined together along their vertical edges, leaving the top edge 62 unattached for access into a pocket 64 formed by the middle front wall 42 and the middle rear wall 56 (see FIG. 7). The interior rear wall 58 is adjacent to the back wall 6 and joined together along their vertical edges, leaving the top edge 72 unattached for access into a pocket 74 formed by the interior rear wall 58 and the back wall 6 (see FIG. 8).

Mesh bags or pouches 60, preferably water-proof, are attached to the middle rear wall 56 by standard means, such as by sewing or stitching. The mesh bags 60 are longitudinal with a diagonal opening 63 closed by a zipper 66. The diagonal opening 63 is oriented across the length and width of the bag to advantageously provide a larger opening. The mesh bags 60 are disposed vertically so that supplies in hard longitudinal packaging, various survival aid items such as flashlight, radio, flares, medical supplies, etc. will allow the backpack 2 to flex along vertical lines when being carried on the back of the user and for proper packaging of the backpack to ensure it properly fits within the ejection seat kit. On the other side of the middle front wall 42 are the broken down rifle also arranged vertically (see FIG. 5). The vertical spacing 68 between the mesh bags 60 advantageously allows for the vertical flexing of the backpack 2.

Mesh bags 70, preferably water-proof, are removably attached to the interior rear wall 58. The interior rear wall 58 is adjacent to the rear wall 6 and joined together along their vertical and bottom edges, leaving the top edge 72 unattached for access into a pocket 74 formed by the interior rear wall 58 and the rear wall 6 (see FIG. 8). The mesh bags 70 may be used to store various survival aid items, such as drinking water in flat pouches at the time of proper packaging for the ejection seat kit. Once deployed from the ejection seat kit and in use by the pilot, these pouches along with the others throughout the backpack can be used to stow any item that will fit. The mesh bags 70 are disposed horizontally to advantageously provide some cushioning to the user's back during use. The mesh bags 70 include openings 71 disposed diagonally across the length and width of the bags to advantageously provide a larger opening. The openings 71 are closed or opened by a zipper 73.

Figure 8:
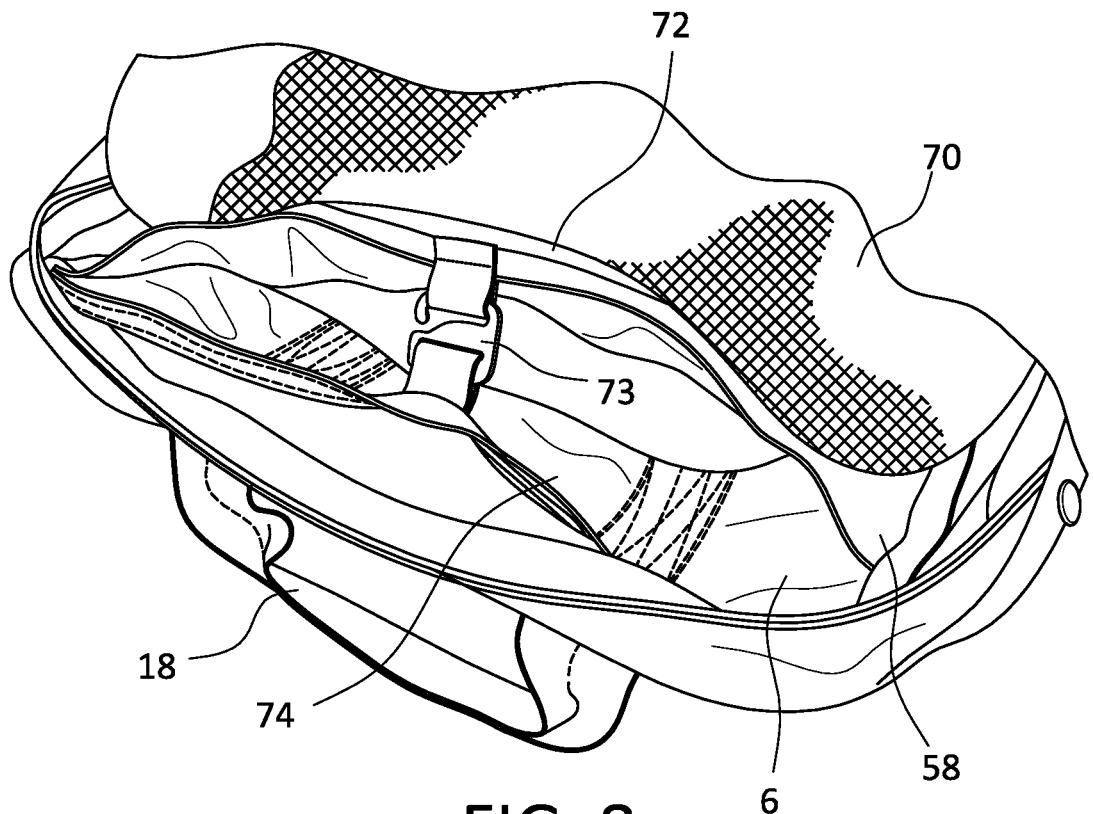
FIGS. 7 and 8 are partial perspective views taken from FIG. 6 showing pockets behind the mesh bags.
Figure 7:
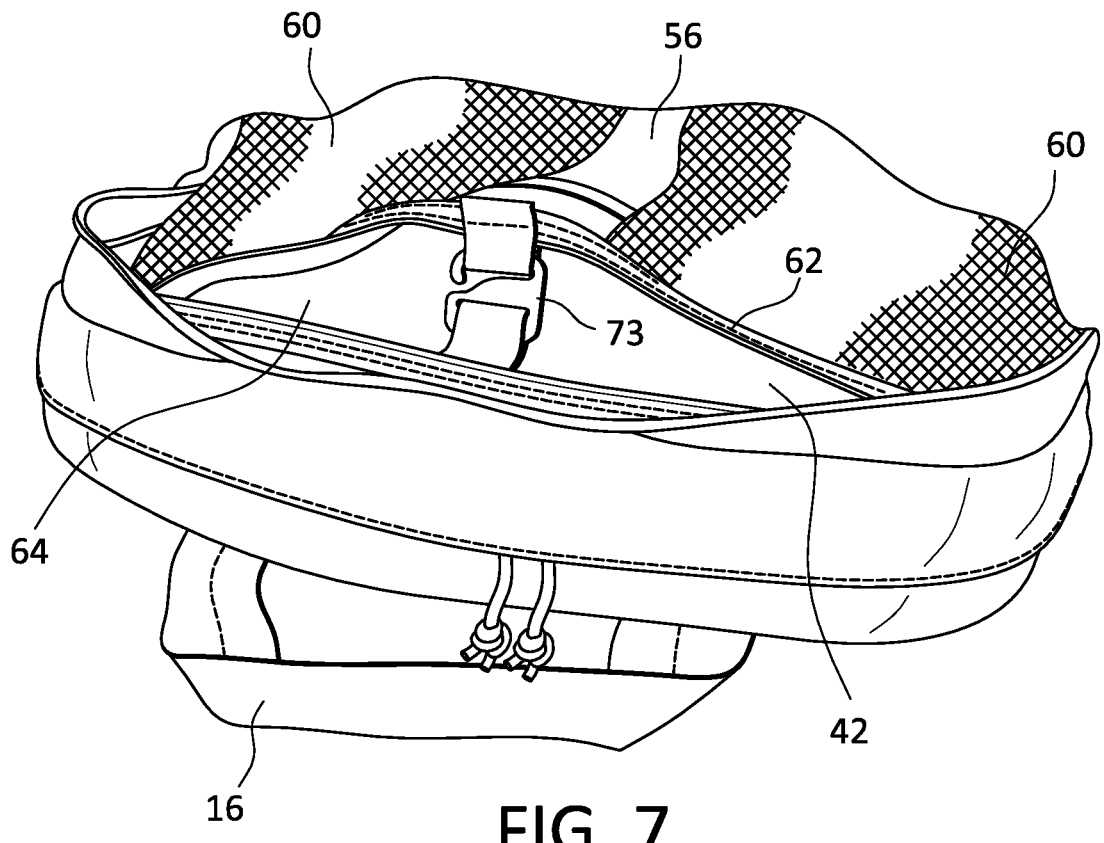
Figure 10:
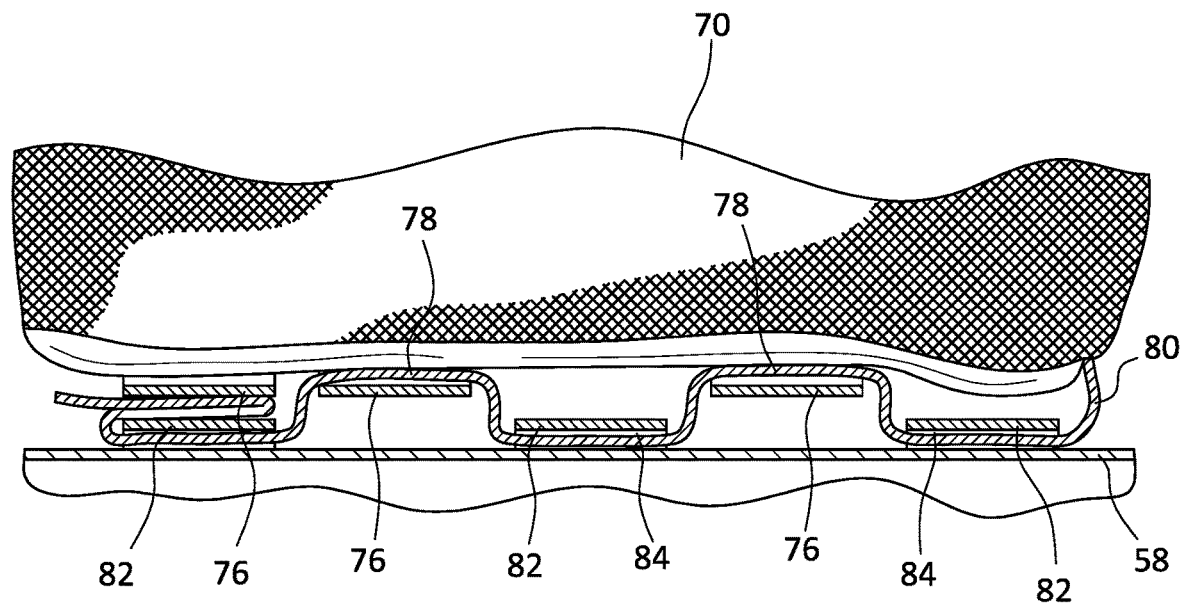
FIG. 10 is a cross-sectional view taken along line 10-10 in FIG. 6.

Referring to FIGS. 7 and 8, the pockets 64 and 74 are partially closed by respective hooks 73. The pockets 64 and 74 are accessible from the rear compartment 54.

Referring to FIG. 9, the underside of the mesh bags 70 is provided with straps 76 with half-loops 78. Along one edge of the mesh bags 70 are straps 80 with one end attached. Straps 82 with half-loops 84 are attached to the interior rear wall 58. To attach the bags 70 to the wall 58, the straps 80 are threaded alternately through the half-loops 84 and 78. The straps 76 and 82 are stitched or sewn at intervals at 86 to create the respective half-loops 78 and 84. The system of straps is also known as MOLLE (modular, lightweight load-carrying equipment) that allows a user to attach multi-tools, knives, magazine pouches, and other equipment to tactical backpacks, rucksacks, and load-bearing vests.

Figure 11:
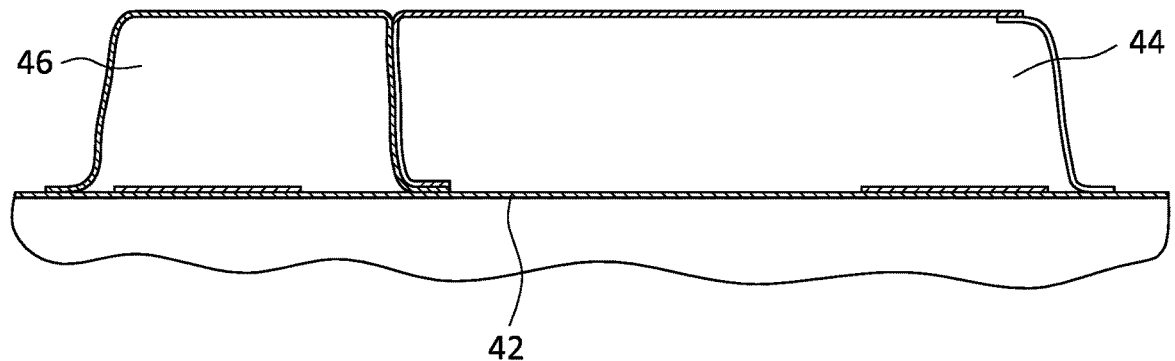
FIG. 11 is a cross-sectional view taken along line 11-11 in FIG. 5.

Referring to FIGS. 5 and 11, the pocket 44 is wider at the opening than at the bottom to advantageously accommodate the shape of the receiver and the gunstock of the rifle. The pocket 46 is substantially longitudinal to advantageously accommodate the barrel of the rifle. The pocket 44 can also accommodate a pistol and other handguns.

Figure 12:
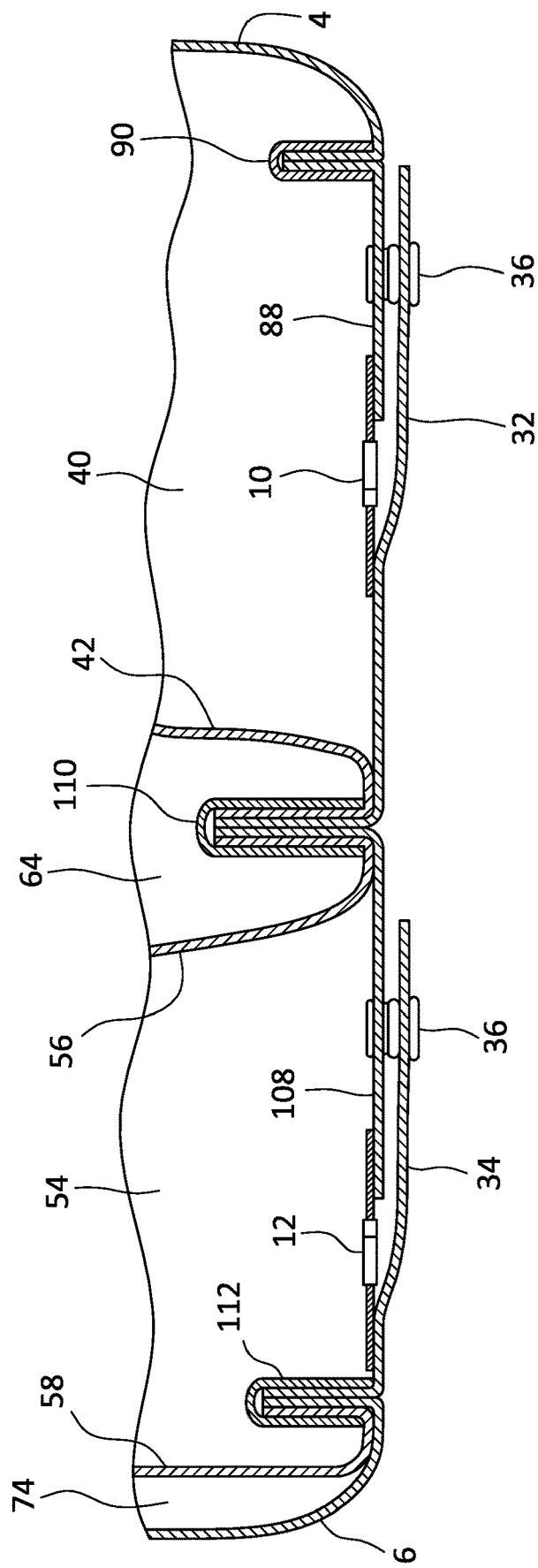
FIG. 12 is a cross-sectional view taken along line 12-12 in FIG. 4.

Referring to FIG. 12, the flaps 32 and 34 are shown covering the respective zippers 10 and 12 and removably attached to the respective side walls 88 and 108 of the backpack with the snaps 36. The flaps 32 and 34 advantageously relieve any stresses on the zippers 10 and 12 due to the backpack stretching from the weight of the items inside. The front compartment 40, the rear compartment 54 and the pockets 64 and 74 are clearly shown.

The front wall 4 is attached to the side wall 88 at connection 90 by sewing. The flap 32 is attached to the side wall 108, the middle front wall 42 and the middle rear wall 56 at connection 110 by sewing. The flap 34, the interior rear wall 58 and the back wall 6 are attached together by sewing at connection 112. The flaps 32 and 34 are thus operably attached to the front wall 4 and the back wall 6 through the connections 90, 110 and 112 and the snaps 36 so that the flaps 32 and 36 when attached to the respective snaps 36 can be used in the event the zipper(s) fail or if zippers are intact the snaps will reinforce or take some of the stresses that may be imposed on the zippers 10 and 12, thereby making the backpack a stronger unit.

Figure 13:
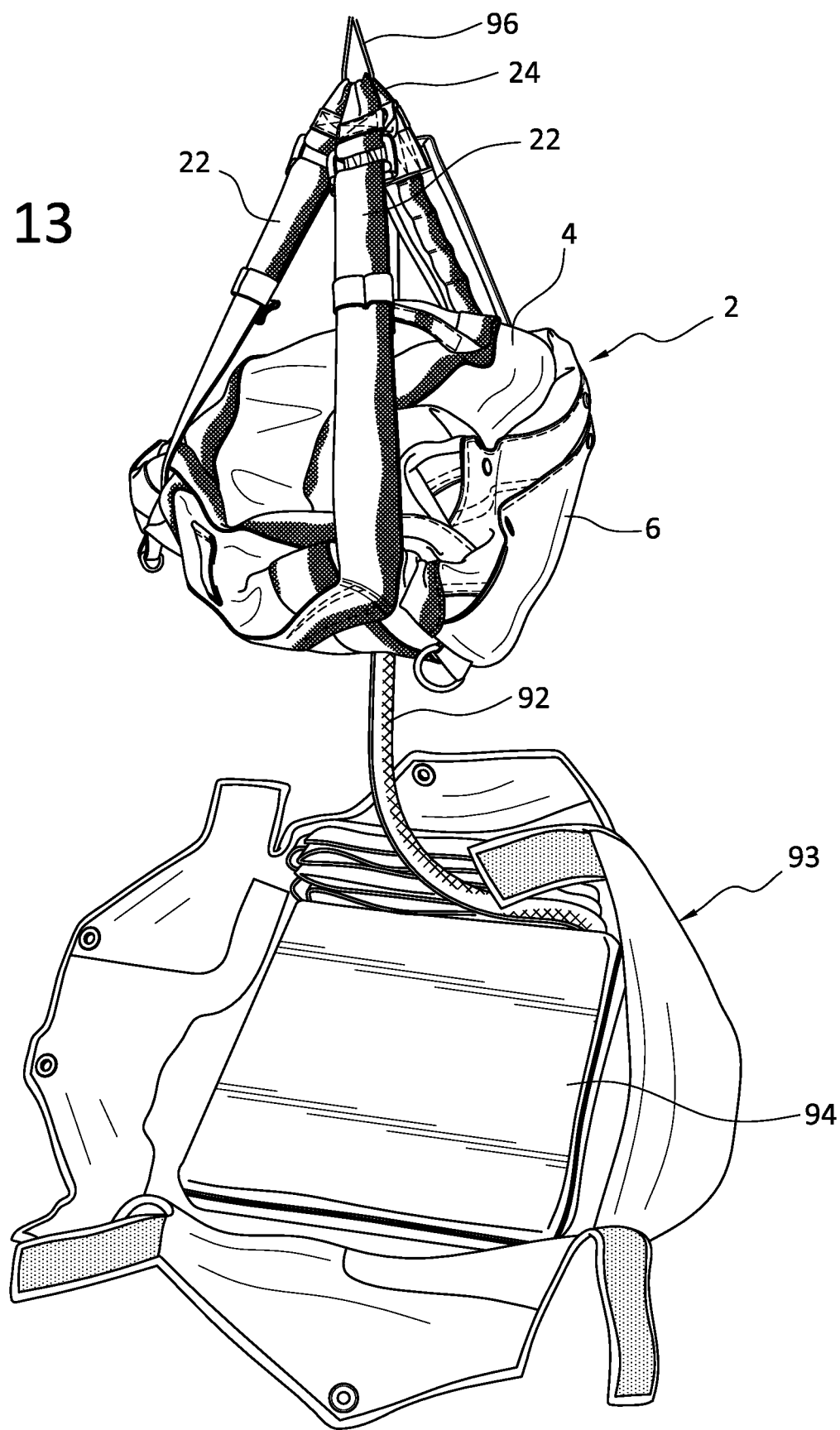
FIG. 13 is a perspective view of the backpack as it is separating from a stowage bag.

Referring to FIG. 13, the backpack 2 outfitted with supplies is stowed inside an outer bag 93 along with a single man life raft 94, connected together by a dropline 92 which is attached to the outer bag 93. The bag 93, which comprises an ejection seat kit, is stowed in a seat pan of an ejection seat, such as the system utilized by pilots in specific aircrafts that utilize the ACES II and/or ACES 5 Ejection Seat Platforms (or other similarly configured ejection seats. The backpack 2 is packed horizontally such that the back wall 6 is at the bottom and the front wall 4 is at the top. The shoulder straps 22 are brought out from the back wall 6 to the front wall 4 which inverts them and are attached to a dropline 92 which attaches to a single man life raft which then attaches to the outer bag 93. The outer bag 93 is attached directly to the pilot's parachute harness. By bringing the shoulder straps 22 to face the front wall 4, the weight and force of the backpack when deployed and applied through the dropline is supported by the straps 14 (see FIG. 2) which are attached to the back wall 6 and the shoulder straps 22. In this manner, the force applied to the backpack when deployed and applied through the dropline is advantageously supported by the back wall 6, without imposing any stresses on the zippers 10 and 12. The force includes the force applied by the weight of the backpack and the sudden deceleration applied by the dropline 92 when the backpack as it is free-falling reaches the end of the uncoiling dropline and decelerates to the terminal velocity of the parachute, and outside aerodynamic loads if it were prematurely released from the outer bag 93. The shoulder straps 22 double as a suspension system when reversed to cradle the backpack when snatch load from falling is applied. Reversal allows for load to not be exerted through the zippers 10 and 12 and the snaps 36 on the perimeter of backpack. By positioning the backpack 2 substantially horizontally, the backpack is more stable in the air during the drop since it presents a lesser amount of surface area to the wind than if it were hanging vertically. An inflatable life raft 94 is also stowed in the bag 92.

The dropline 92 may also be tied to the half-loop handles 16 and 18 (see FIG. 4). The handles 16 and 18 are brought together and attached to the dropline 92 in the same manner that the shoulder straps 22 are brought together as shown in FIG. 13. The strap 14 advantageously cradles the backpack and its weight since the strap 14 makes a complete loop, running vertically up and vertically down on front wall 4 and the back wall 6 and underneath the bottom wall 8. The strap 14 takes all of the load from the backpack during the drop, thereby relieving stress from the zippers 10 and 12.

Figure 14:
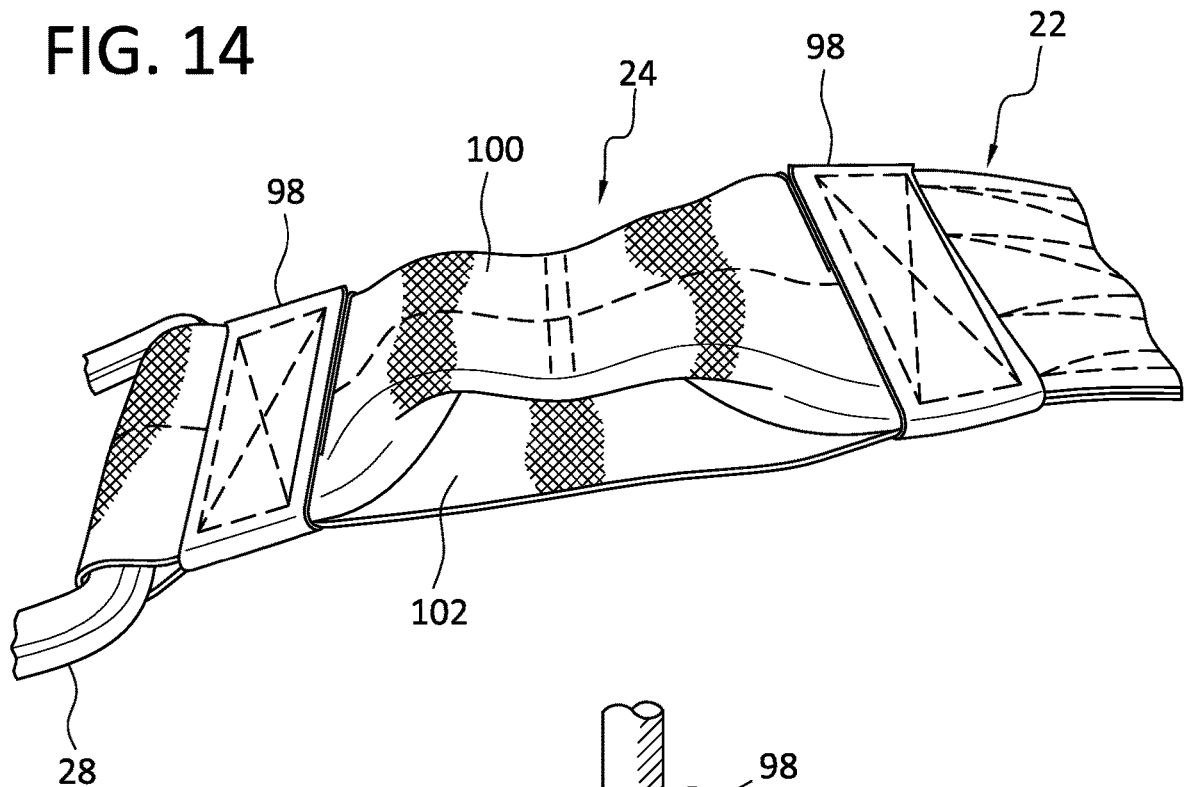
FIG. 14 is a perspective view of a loop in the shoulder strap used to hang the backpack from a dropline.
Figure 15:
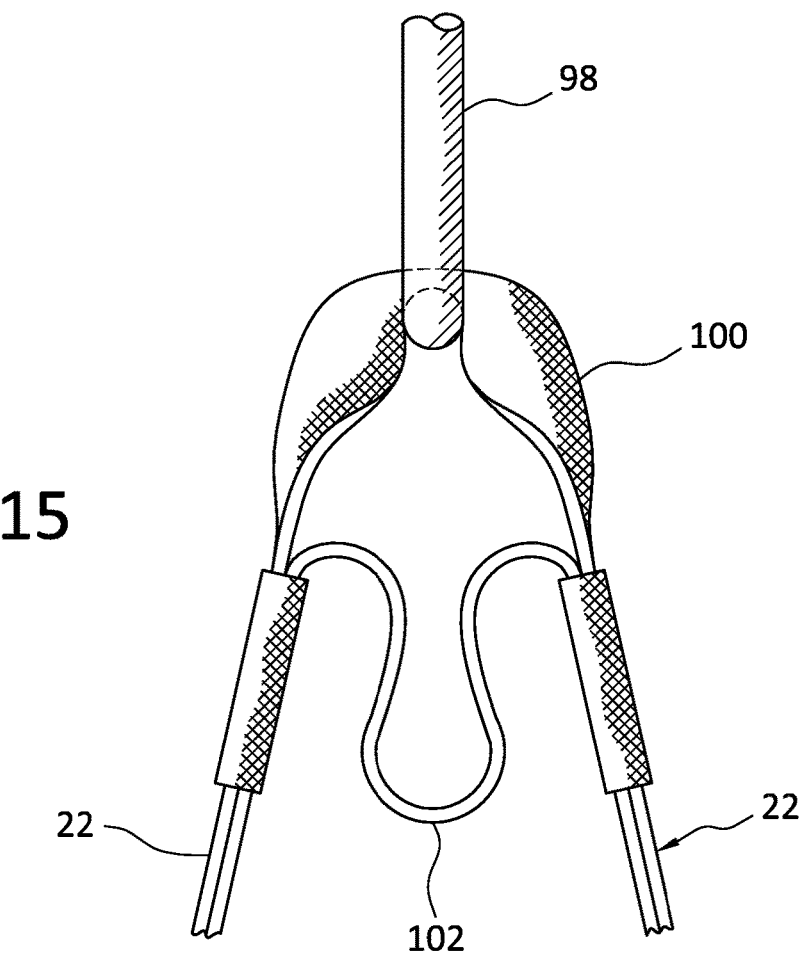
FIG. 15 is a side view of the loop of FIG. 14 shown attached to a clip.

Referring to FIGS. 14 and 15, the loops 24 are made from the same shoulder strap material. The strap 22 is wrapped around the buckle 28 and attached to itself at 98, with a portion 100 overlying another portion 102. The portion 100 is folded along its opposite edges and attached to itself, advantageously reinforcing the loop 24 and decreasing its width to facilitate attachment to the clip 96. The loops 24, when shoulder straps are properly donned by the pilot, will be against the chest of the user.

Figure 16:
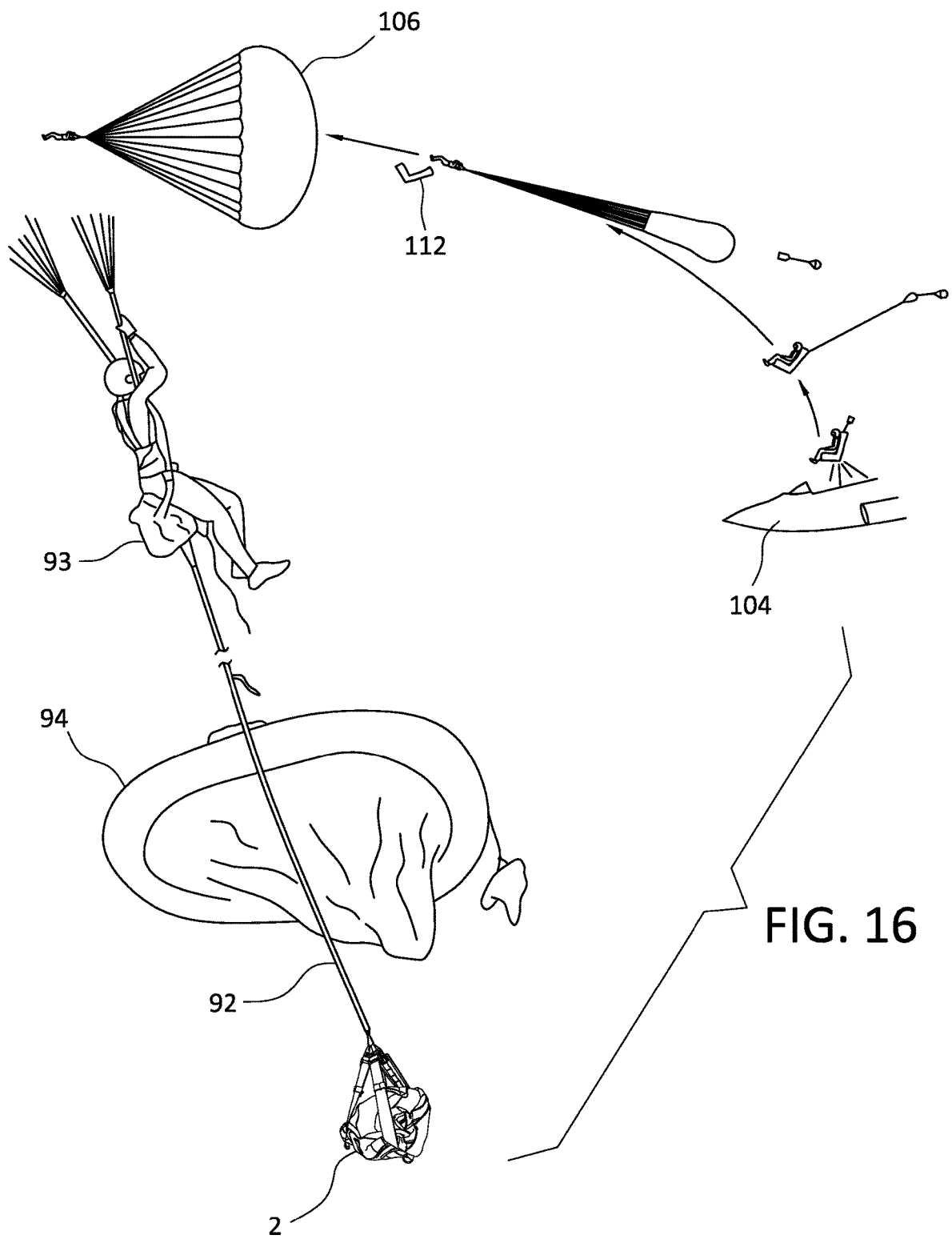
FIG. 16 is a sequence showing ejection of a pilot from an aircraft with the backpack attached to a dropline attached to a parachute.

Referring to FIG. 16, the backpack 2 is used by pilots ejecting from an aircraft 104. The bag 93 remains with the pilot throughout the ejection process. The backpack 2 is released from bag 93 once the pilot is under parachute 106. The backpack 2 is tethered to the dropline 92. The shoulder straps 22 when brought to the front advantageously serve as a suspension system to cradle the backpack from the dropline 92.

Figure 17:
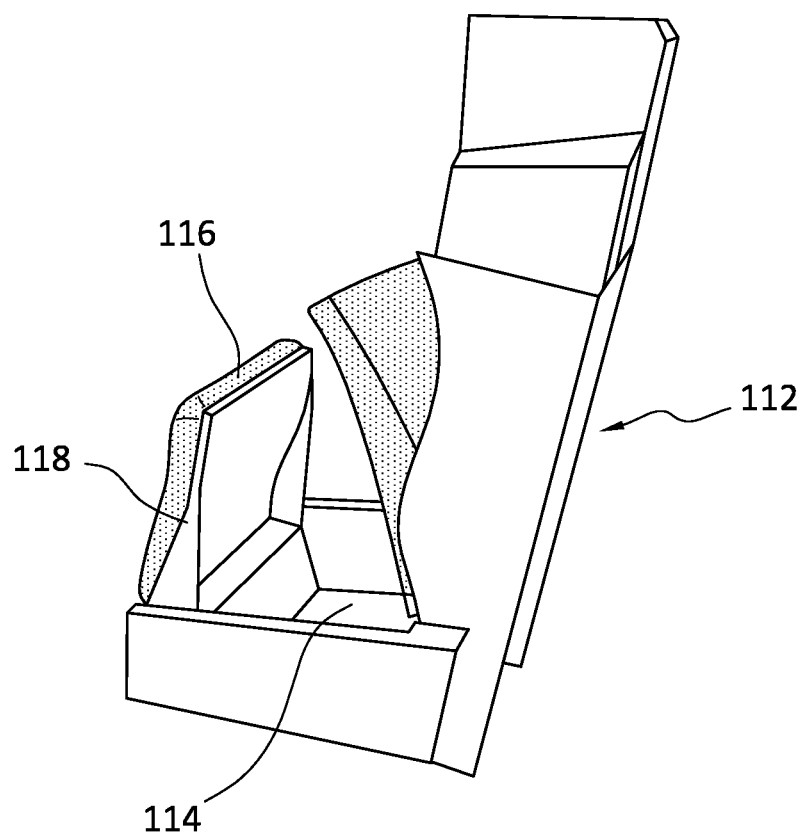
FIG. 17 is a perspective view of an ejection seat in which the backpack of FIG. 1 is stowed.

Referring to FIG. 17, a standard ejection seat 112, such as the ACES II or ACES 5 Ejection Seat, includes a seat pan 114 in which the backpack 2 inside the bag 93 is disposed. The seat pan 114 provides a cavity for stowage of the bag 93. The bag 93 is stowed flat inside the seat pan 114. The seat pan 114 lies underneath a seat cushion 116 and its seat support 118. The seat cushion 116 and seat support 118 are shown in the open position to allow the user to gain access to the seat pan 114 for placement of the bag 93. The bag 93 is attached to the parachute harness to which the pilot is attached during flight. After the pilot ejects from the aircraft 104, the ejection seat 112 separates from the pilot. The bag 93 stays with the pilot and the backpack 2 is subsequently released from the bag 93.

Although the backpack 2 is shown in conjunction with an ejection seat kit, the backpack 2 can also be stored in other restricted volumes near the pilot or user and may also be utilized in other dropline applications, such as helicopters/rappel lines.

Although the present invention is disclosed as a backpack, a bag with all the disclosed elements of the backpack but without the shoulder straps will also work in the same way as the backpack in terms of carrying survival aid items, being stowed in a confined space and being able to be attached to a dropline.

While this invention has been described as having preferred design, it is understood that it is capable of further modifications, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A bag, comprising:
a) a back wall, a front wall, a bottom wall and a side wall extending from one end portion of the bottom wall to an opposite end portion of the bottom wall;
b) a first shoulder strap and a second shoulder strap, the first shoulder strap including a first end portion and a second end portion, the first end portion being operably attached to the back wall, the second shoulder strap including a third end portion and a fourth end portion, the third end portion being operably attached to the back wall; and
c) a lower strap with an intermediate portion horizontally attached to a lower portion of the back wall, the lower strap having a fifth end portion and a sixth end portion, the lower strap extending from the back wall and the intermediate portion to the fifth end portion being operably attached to the second end portion of the first shoulder strap, the lower strap extending from the back wall and the intermediate portion to the sixth end portion being operably attached to the fourth end portion of the second shoulder strap.

2. The bag as in claim 1, and further comprising:
a) a first interior wall disposed between the front wall and the back wall to define a first compartment between the front wall and the first interior wall, and a second compartment between the back wall and the first interior wall;
b) the side wall including a first opening for access into the first compartment and a second opening for access into the second compartment, the first opening and the second opening extending from the one end portion to the opposite end portion of the bottom wall; and
c) a first zipper and a second zipper operably attached to the side wall, the first zipper and the second zipper for closing or opening the first opening and the second opening, respectively.

3. The bag as in claim 2, wherein:
a) the side wall includes a first flap portion and a second flap portion overlying the first zipper and the second zipper, respectively; and
b) the first flap portion is removably attached to a first portion of the side wall across from the first opening; and
c) the second flap portion is removably attached to a second portion of the side wall across from the second opening.

4. The bag as in claim 2, wherein:
a) the first compartment includes a first pocket with a top opening; and
b) the first pocket is operably attached to the first interior wall in a vertical orientation relative to the bottom wall.

5. The bag as in claim 4, wherein the first pocket is wider at a top portion than at a bottom portion.

6. The bag as in claim 2, wherein:
a) the second compartment includes a first pouch with a first zipper opening arranged in a vertical orientation relative to the bottom wall;
b) the second compartment includes a second pouch with second zipper opening arranged in a horizontal orientation relative to the bottom wall; and
c) the first pouch and the second pouch are operably secured such that when the second compartment is opened flat inside out, the first pouch and the second pouch are disposed above the front wall and the back wall, respectively.

7. The bag as in claim 6, and further comprising:
a) a second interior wall adjacent the first interior wall to define a pocket with a top opening; and
b) the first pouch is operably attached to the second interior wall.

8. The bag as in claim 6, and further comprising:
a) a second interior wall adjacent the back wall to define a pocket with a top opening; and
b) the second pouch is operably attached to the second interior wall.

9. The bag as in claim 1, and further comprising:
a) a loop of reinforcement strap attached to the front wall, the back wall and the bottom wall;
b) the loop of reinforcement strap includes first and second portions disposed vertically on the front wall and forming a first half-loop above the bag;
c) the loop of reinforcement strap includes third and fourth portions disposed vertically on the back wall and forming a second half-loop above the bag; and
d) the first half-loop and the second half-loop provide openings for the user's hand for carrying the bag.

10. The bag as in claim 1, wherein the bag is disposed inside an ejection seat of an aircraft.

11. The bag as in claim 10, wherein:
a) the first shoulder strap and the second shoulder strap include first and second loops, respectively; and
b) a drop line is attached to the first and second loops.

12. The bag as in claim 1, wherein:
a) a first reinforcement strap and a second reinforcement strap are attached vertically on the back wall and to the intermediate portion of the lower strap;
b) the first end portion of the first shoulder strap is attached to the first reinforcement strap; and
c) the third end portion of the second shoulder strap is attached to the second reinforcement strap.

13. The bag as in claim 1, wherein:
a) the second end portion of the first shoulder strap includes a first buckle;

b) the fourth end portion of the second shoulder strap includes a second buckle; and
c) the fifth end portion of the lower strap is operably attached to the first buckle; and
d) the sixth end portion of the lower strap is operably attached to the second buckle.

14. A backpack for placement inside an ejection seat of an aircraft, comprising:
a) a front wall and a back wall;
b) a first shoulder strap and a second shoulder strap;
c) the first shoulder strap including a first end portion and a second end portion, the first end portion is operably attached to the back wall, the second end portion is disposed over the front wall, the first shoulder strap including a first loop;
d) the second shoulder strap including a third end portion and a fourth end portion, the third end portion is operably attached to the back wall, the fourth end portion is disposed over the front wall, the second shoulder strap including a second loop;
e) a lower strap with an intermediate portion horizontally attached to a lower portion of the back wall, the lower strap having a fifth end portion and a sixth end portion, the lower strap extending from the back wall and the intermediate portion to the fifth end portion disposed over the front wall and the fifth end portion being operably attached to the second end portion, the lower strap extending from the backwall and the intermediate portion to the sixth end portion disposed over the front wall and the sixth end portion being operably attached to the fourth end portion; and
f) the first loop and the second loop for being attached together to a dropline.

15. The backpack as in claim 14, and further comprising a drop line attached to the first loop and the second loop.

16. The backpack as in claim 15, wherein the backpack is disposed inside an ejection seat of an aircraft.

17. The backpack as in claim 16, wherein:
a) the ejection seat includes a seat pan; and
b) the backpack is disposed inside the seat pan.

18. The backpack as in claim 14, wherein:
a) a loop of reinforcement strap includes a first portion and a second portion attached to the back wall, the first portion returns to the second portion to form a first half-loop;
b) the loop of reinforcement strap includes a third portion and a fourth portion attached to the front wall, the third portion returns to the fourth portion to form a second half-loop next to the first half-loop; and
c) the first half-loop and the second half-loop provide openings for the user's hand for carrying the backpack.

19. The backpack as in claim 18, wherein the first end portion of the first shoulder strap and the third end portion of the second shoulder strap are operably attached to the first portion and the second portion of the loop of reinforcement strap, respectively.

20. The backpack as in claim 19, wherein the first portion and the second portion of the loop of reinforcement strap are operably attached to the intermediate portion of the lower strap.

* * * * *